(12) United States Patent
Lindvall

(10) Patent No.: US 10,868,900 B1
(45) Date of Patent: Dec. 15, 2020

(54) CELLPHONE STAND APPARATUS

(71) Applicant: Sara Lindvall, Lakeville, IN (US)

(72) Inventor: Sara Lindvall, Lakeville, IN (US)

( * ) Notice: Subject to any disclaimer, the term of this patent is extended or adjusted under 35 U.S.C. 154(b) by 6 days.

(21) Appl. No.: 16/527,232

(22) Filed: Jul. 31, 2019

(51) Int. Cl.
*F16M 11/00* (2006.01)
*H04M 1/06* (2006.01)
*F16M 11/38* (2006.01)
*F16B 2/12* (2006.01)
*F16M 11/04* (2006.01)

(52) U.S. Cl.
CPC ............ *H04M 1/06* (2013.01); *F16B 2/12* (2013.01); *F16M 11/041* (2013.01); *F16M 11/046* (2013.01); *F16M 11/38* (2013.01)

(58) Field of Classification Search
CPC .......................... A47L 97/04; A47L 97/08
USPC .... 248/441.1, 446, 447, 449, 454, 455, 457, 248/460
See application file for complete search history.

(56) References Cited

U.S. PATENT DOCUMENTS

| | | | | |
|---|---|---|---|---|
| 5,078,353 A * | 1/1992 | Linn | ............... | B25H 3/006 211/70.6 |
| 5,310,244 A | 5/1994 | Borgardt | | |
| 5,382,074 A | 1/1995 | Pietra | | |
| 5,598,786 A | 2/1997 | Patterson | | |
| 5,620,163 A * | 4/1997 | Wu | ............. | H04B 1/38 248/688 |
| 5,833,200 A | 11/1998 | Patterson | | |
| 6,044,758 A | 4/2000 | Drake | | |
| 6,170,405 B1 | 1/2001 | Weitzman | | |
| D624,922 S | 10/2010 | Hul | | |
| 8,123,189 B2 * | 2/2012 | Phifer | ............. | A47B 23/044 248/460 |
| 8,205,561 B1 * | 6/2012 | Bierworth | ............. | A47C 7/705 108/9 |
| 8,424,830 B2 | 4/2013 | Yang | | |
| 8,474,609 B1 * | 7/2013 | Hong | ............. | A45C 11/00 206/45.2 |
| D687,835 S | 8/2013 | Gittins | | |
| 8,714,510 B2 | 5/2014 | McCosh | | |
| 9,151,439 B2 * | 10/2015 | Liang | ............. | F16M 13/00 |
| D769,247 S | 10/2016 | Heyen | | |
| 9,683,693 B2 * | 6/2017 | Yu | ............. | G06F 1/166 |
| 2008/0216370 A1 * | 9/2008 | Glass | ............. | G09F 15/0062 40/610 |
| 2011/0180682 A1 * | 7/2011 | Tarnutzer | ............. | G06F 1/1616 248/447 |

* cited by examiner

Primary Examiner — Steven M Marsh

(57) ABSTRACT

A cellphone stand apparatus for supporting a cellphone on any surface at a desired height includes a base, and a stand. A hinge is coupled to the stand to swingingly move the stand between a collapsed position and an alternative extended position with the stand angled away from the base to serve as a kickstand. A holder is configured to support a cellphone. A pair of mounting clips is coupled to the holder. The pair of mounting clips is U-shaped and selectively engageable within a pair of clip apertures of the holder and a plurality of mounting apertures of the base to secure the holder to the base at a desired height.

9 Claims, 5 Drawing Sheets

CELLPHONE STAND APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to cellphone accessories and more particularly pertains to a new cellphone accessory for supporting a cellphone on any surface at a desired height.

BRIEF SUMMARY OF THE INVENTION

An embodiment of the disclosure meets the needs presented above by generally comprising a base having a base front face, a base back face, a base top edge, a base bottom edge, a base left edge, and a base right edge. Each of the base left edge and the base right edge has a plurality of mounting apertures extending therethrough. A stand is coupled to the base. The stand has a hinge coupled to a stand top edge. The hinge is coupled to the base back face to swingingly move the stand between a collapsed position with a stand inner face adjacent the base back face and an alternate extended position with the stand angled away from the base to serve as a kickstand. A holder has a holder front face, a holder back face, a holder top edge, a holder bottom edge, a holder left edge, and a holder right edge. The holder has a vertical holder back portion and a lip portion perpendicularly extending from the holder bottom edge. Each of the holder left edge and the holder right edge has a clip aperture extending therethrough. The holder is configured to support a cellphone. A pair of mounting clips is coupled to the holder. The pair of mounting clips is U-shaped and selectively engageable within the clip aperture of the holder left edge and the holder right edge and the plurality of mounting apertures of the base left edge and the base right edge to secure the holder to the base at a desired height.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
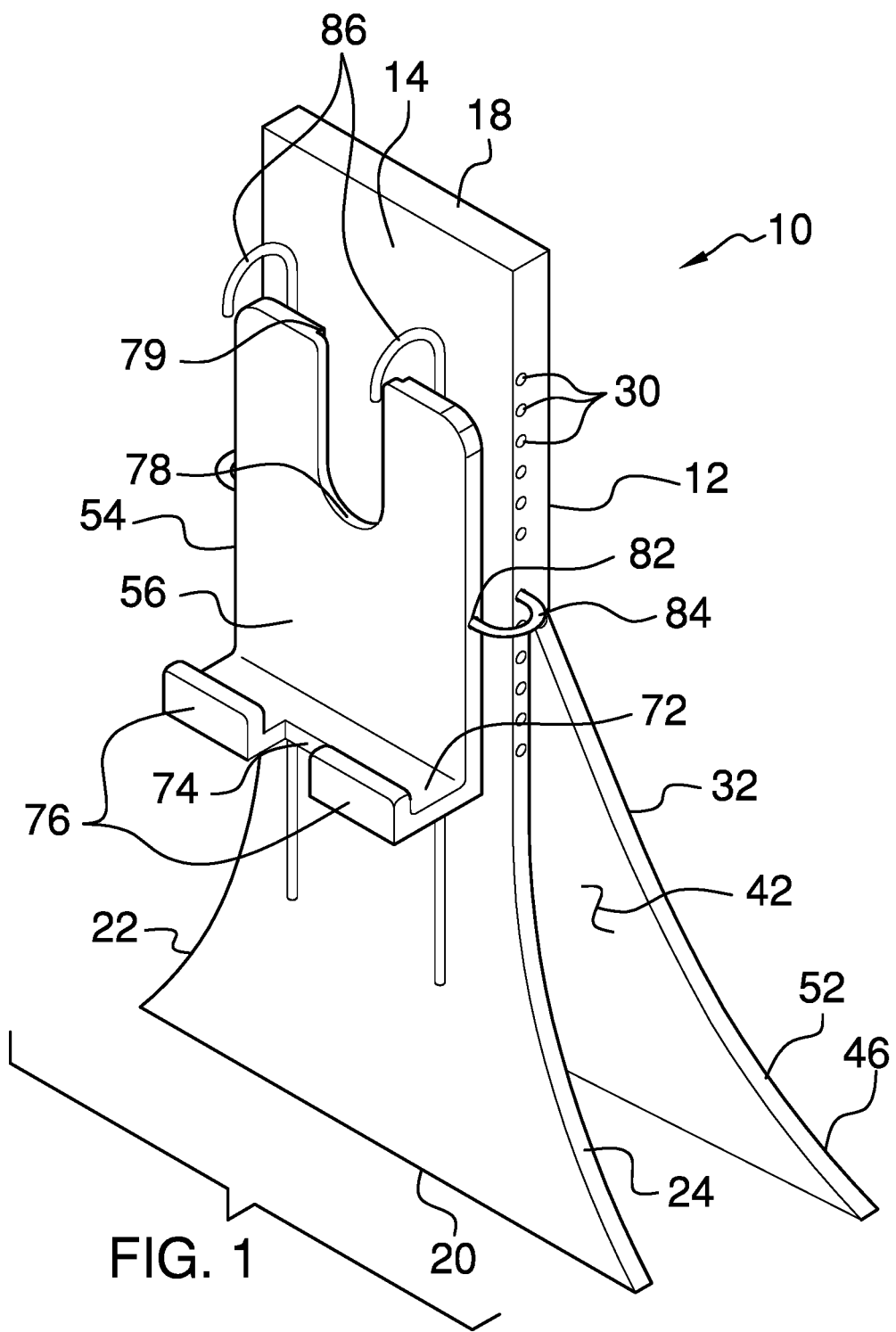
FIG. 1 is an isometric view of a cellphone stand apparatus according to an embodiment of the disclosure.
Figure 2:
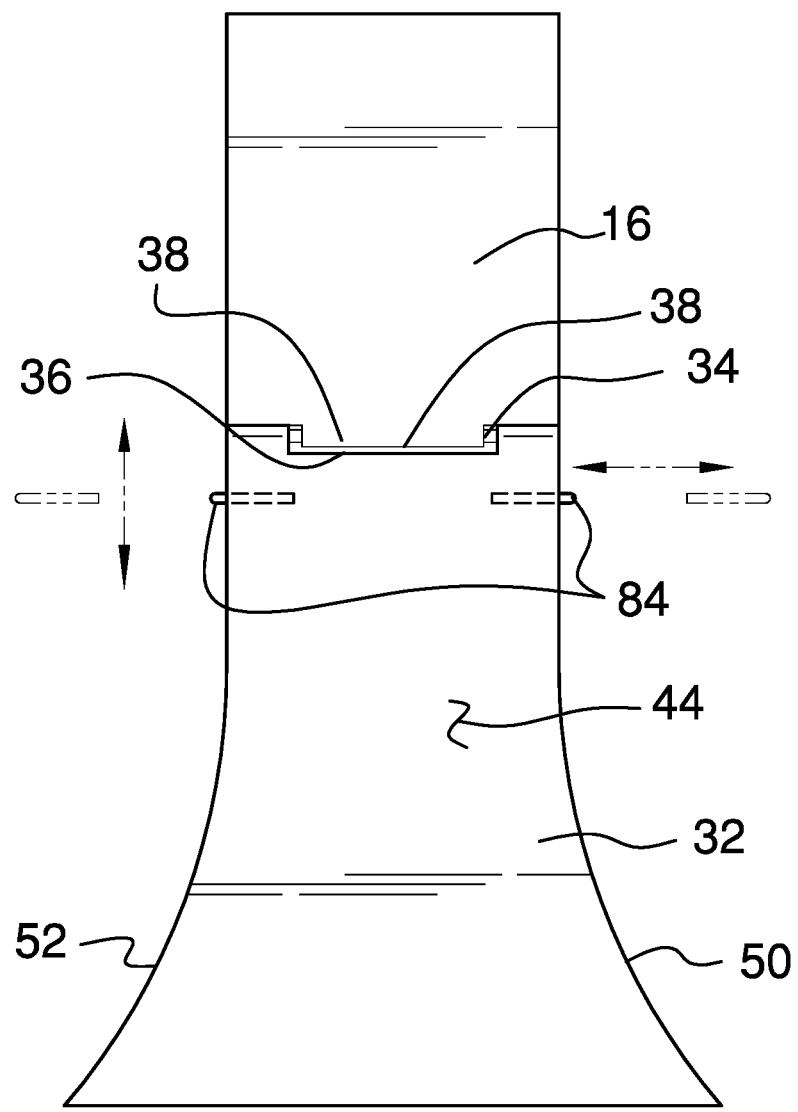
FIG. 2 is a rear elevation view of an embodiment of the disclosure.
Figure 3:
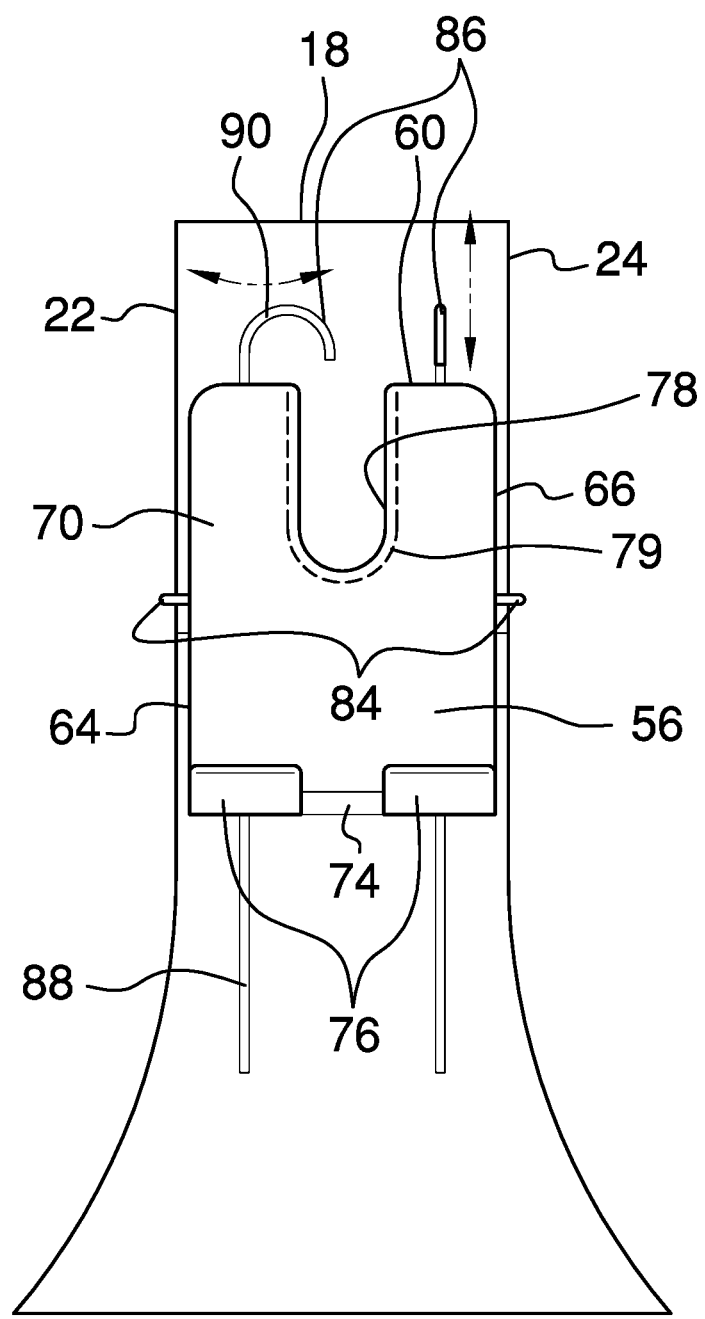
FIG. 3 is a front elevation view of an embodiment of the disclosure.
Figure 4:
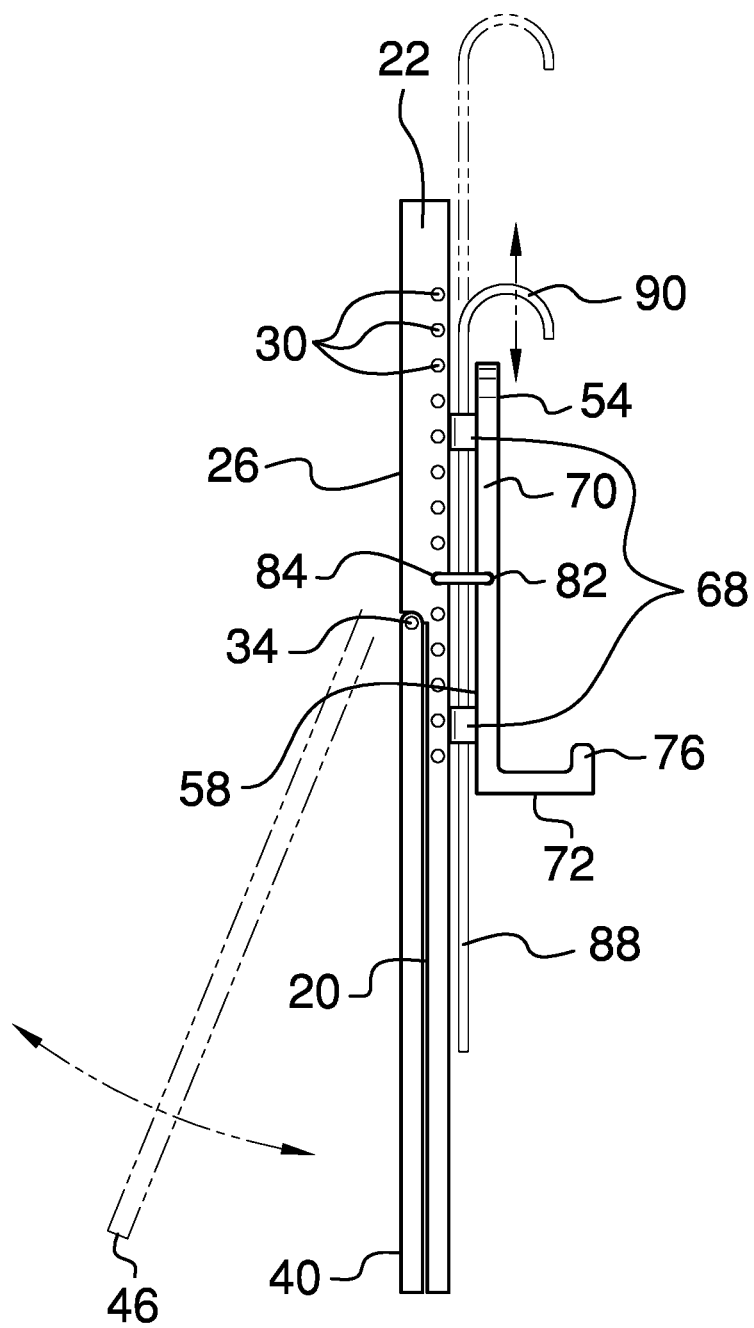
FIG. 4 is a side elevation view of an embodiment of the disclosure.
Figure 5:
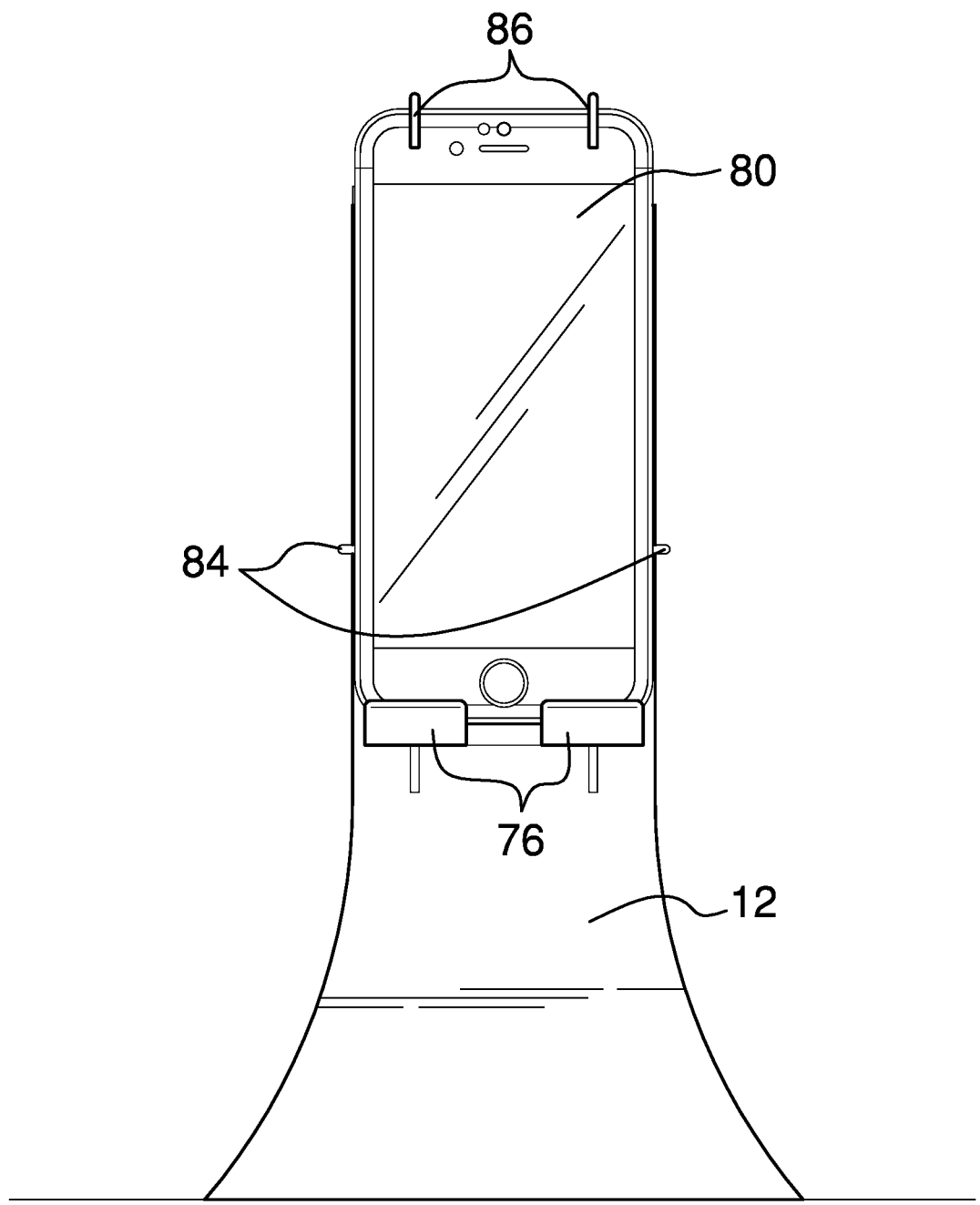
FIG. 5 is an in-use view of an embodiment of the disclosure.

With reference now to the drawings, and in particular to FIGS. 1 through 5 thereof, a new cellphone accessory embodying the principles and concepts of an embodiment of the disclosure and generally designated by the reference numeral 10 will be described.

As best illustrated in FIGS. 1 through 5, the cellphone stand apparatus 10 generally comprises a base 12 having a base front face 14, a base back face 16, a base top edge 18, a base bottom edge 20, a base left edge 22, and a base right edge 24. The base back face 16 has an upper portion 26 and a recessed lower portion 28. The base left edge 22 and the base right edge 24 are concave along the lower portion 28 to create a wider base bottom edge 20. Each of the base left edge 22 and the base right edge 24 has a plurality of mounting apertures 30 extending therethrough. A stand 32 is coupled to the base 12. The stand 32 has a hinge 34 coupled to a stand top edge 36. The hinge 32 is coupled to a hinge extension 38 of the upper portion 26 adjacent the lower portion 28 to swingingly move the stand 32 between a collapsed position 40 with a stand inner face 42 adjacent the base back face 16 within the recessed lower portion 28 such that a stand outer face 44 lies coplanar with the upper portion 26 and an alternate extended position 46 with the stand 32 angled away from the base 12 to serve as a kickstand. The curvature of a stand left edge 50 and a stand right edge 52 conforms to the base left edge 22 and the base right edge 24. A holder 54 has a holder front face 56, a holder back face 58, a holder top edge 60, a holder bottom edge 62, a holder left edge 64, and a holder right edge 66. The holder back face 58 has a plurality of hook guides 68. The holder 54 has a vertical holder back portion 70 and a lip portion 72 perpendicularly extending from the holder bottom edge 62. The lip portion 72 has a charger notch 74 and a pair of raised vertical sections 76 on either side of the charger notch 74. A U-shaped holder notch 78 extends from the holder top edge 60 towards the holder bottom edge 62. The holder back face 58 is recessed around a perimeter 79 of the holder notch 78. The holder notch 78 is configured to accommodate a collapsible phone grip coupled to a cellphone 80. Each of the holder left edge 64 and the holder right edge 66 has a clip aperture 82 extending therethrough. The holder 54 is configured to support the cellphone 80. A pair of mounting clips 84 is coupled to the holder 54. The pair of mounting clips 84 is U-shaped and selectively engageable within the clip aperture 82 of the holder left edge 64 and the holder right edge 66 and the plurality of mounting apertures 30 of the base left edge 22 and the base right edge 24 to secure the holder 54 to the base 12 at a desired height. A pair of support hooks 86 is coupled to the holder 54. The pair of support hooks 86 has a straight portion 88 and a hooked portion 90. The straight portion 88 of each of the support hooks 86 is slidably coupled within two of the hook guides 68 of the holder 54. The hooked portion 90 is configured to secure the cellphone 80 to the holder 54.

In use, the hinge 32 is utilized to swingingly move the stand 32 between the collapsed position 40 to the extended position 46 with the stand 32 angled away from the base 12 to serve as a kickstand. The pair of mounting clips 84 is engaged with the desired mounting apertures 30 to achieve the desired height. The cellphone 80 is then placed in the holder 54 and the support hooks 86 are used to secure the cellphone 80 to the holder 54.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cellphone stand apparatus comprising:
   a base, the base having a base front face, a base back face, a base top edge, a base bottom edge, a base left edge, and a base right edge, each of the base left edge and the base right edge having a plurality of mounting apertures extending therethrough;
   a stand coupled to the base, the stand having a hinge coupled to a stand top edge, the hinge being coupled to the base back face to swingingly move the stand between a collapsed position with a stand inner face adjacent the base back face and an alternate extended position with the stand angled away from the base to serve as a kickstand;
   a holder, the holder having a holder front face, a holder back face, a holder top edge, a holder bottom edge, a holder left edge, and a holder right edge, the holder having a vertical holder back portion and a lip portion perpendicularly extending from the holder bottom edge, each of the holder left edge and the holder right edge having a clip aperture extending therethrough, the holder being configured to support a cellphone; and
   a pair of mounting clips coupled to the holder, the pair of mounting clips being U-shaped and selectively engageable within the clip aperture of the holder left edge and the holder right edge and the plurality of mounting apertures of the base left edge and the base right edge to secure the holder to the base at a desired height.

2. The cellphone stand apparatus of claim 1 further comprising a pair of support hooks coupled to the holder, the pair of support hooks having a straight portion and a hooked portion, the straight portion being slidably coupled to the holder back face, the hooked portion being configured to secure the cellphone to the holder.

3. The cellphone stand apparatus of claim 2 further comprising the holder back face having a plurality of hook guides, the straight portion of each of the support hooks being slidably coupled within two of the hook guides.

4. The cellphone stand apparatus of claim 1 further comprising the base back face having an upper portion and a recessed lower portion, the base left edge and the base right edge being concave along the lower portion to create a wider base bottom edge, the stand being coupled to a hinge extension of the upper portion adjacent the lower portion.

5. The cellphone stand apparatus of claim 4 further comprising the curvature of a stand left edge and a stand right edge conforming to the base left edge and the base right edge, the stand in the collapsed position fitting within the recessed lower portion of the base back face such that a stand outer face lies coplanar with the upper portion.

6. The cellphone stand apparatus of claim 1 further comprising the lip portion having a charger notch and a pair of raised vertical sections on either side of the charger notch.

7. The cellphone stand apparatus of claim 1 further comprising the holder having a U-shaped holder notch extending from the holder top edge towards the holder bottom edge, the holder notch being configured to accommodate a collapsible phone grip coupled to the cellphone.

8. The cellphone stand apparatus of claim 7 further comprising the holder back face being recessed around a perimeter of the holder notch.

9. A cellphone stand apparatus comprising:
   a base, the base having a base front face, a base back face, a base top edge, a base bottom edge, a base left edge, and a base right edge, the base back face having an upper portion and a recessed lower portion, the base left edge and the base right edge being concave along the lower portion to create a wider base bottom edge, each of the base left edge and the base right edge having a plurality of mounting apertures extending therethrough;
   a stand coupled to the base, the stand having a hinge coupled to a stand top edge, the hinge being coupled to a hinge extension of the upper portion adjacent the lower portion to swingingly move the stand between a collapsed position with a stand inner face adjacent the base back face within the recessed lower portion such that a stand outer face lies coplanar with the upper portion and an alternate extended position with the stand angled away from the base to serve as a kickstand, the curvature of a stand left edge and a stand right edge conforming to the base left edge and the base right edge;

a holder, the holder having a holder front face, a holder back face, a holder top edge, a holder bottom edge, a holder left edge, and a holder right edge, the holder back face having a plurality of hook guides, the holder having a vertical holder back portion and a lip portion perpendicularly extending from the holder bottom edge, the lip portion having a charger notch and a pair of raised vertical sections on either side of the charger notch, a U-shaped holder notch extending from the holder top edge towards the holder bottom edge, the holder back face being recessed around a perimeter of the holder notch, the holder notch being configured to accommodate a collapsible phone grip coupled to a cellphone, each of the holder left edge and the holder right edge having a clip aperture extending therethrough, the holder being configured to support the cellphone;

a pair of mounting clips coupled to the holder, the pair of mounting clips being U-shaped and selectively engageable within the clip aperture of the holder left edge and the holder right edge and the plurality of mounting apertures of the base left edge and the base right edge to secure the holder to the base at a desired height; and a pair of support hooks coupled to the holder, the pair of support hooks having a straight portion and a hooked portion, the straight portion of each of the support hooks being slidably coupled within two of the hook guides of the holder, the hooked portion being configured to secure the cellphone to the holder.

* * * * *